United States Patent [19]

Bingel

[11] Patent Number: 5,600,715
[45] Date of Patent: Feb. 4, 1997

[54] INTEGRATED LOOP CURRENT DETECTOR APPARATUS FOR A PSTN MODEM

[75] Inventor: Thomas J. Bingel, Indian Rock Beach, Fla.

[73] Assignee: Lucent Technologies Inc., Murray Hill, N.J.

[21] Appl. No.: 608,418

[22] Filed: Feb. 28, 1996

[51] Int. Cl.$^6$ ............................................. H04M 3/22
[52] U.S. Cl. .................. 379/393; 379/377; 379/379; 379/380; 379/387; 379/162; 379/163
[58] Field of Search ................................. 379/377, 393, 379/379, 380, 387, 162, 163

[56] References Cited

U.S. PATENT DOCUMENTS

| | | | |
|---|---|---|---|
| Re. 29,499 | 12/1977 | Spencer | 379/8 |
| 4,454,385 | 6/1984 | Grantland et al. | 379/190 |
| 4,524,246 | 6/1985 | Meza | 379/377 |
| 4,841,566 | 6/1989 | Lott | 379/352 |
| 5,315,644 | 5/1994 | Lester et al. | 379/103 |

Primary Examiner—Krista M. Zele
Assistant Examiner—Gloria Tebcherani

[57] ABSTRACT

An integrated loop current detector for a public switched telephone network modem. The present invention solves the loop current detect problem in general, and is especially useful in modems employing echo cancellation techniques due the linearity afforded by the invention. In one advantageous embodiment of the present invention, the current detector includes a solid-state loop hold circuit coupled to terminals of the PSTN. A current mirror circuit is coupled in parallel with the loop holding circuit, wherein the current mirror circuit includes a transistor having a control terminal coupled to the DC operating point of the loop holding circuit. The transistor is operable to detect interruptions in loop current. An opto-coupler device having an input coupled to the switching device has an output coupled to a current detect input line of said modem thereby providing an isolated output for quick and reliable indication of current interruptions in said loop hold circuit.

24 Claims, 2 Drawing Sheets

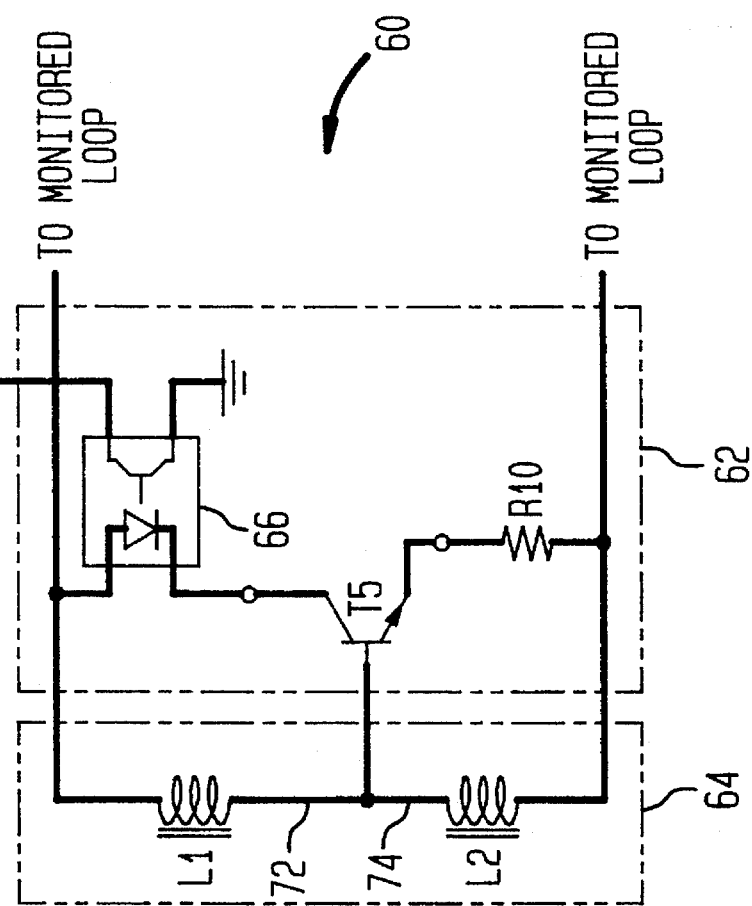

INTEGRATED LOOP CURRENT DETECTOR APPARATUS FOR A PSTN MODEM

FIELD OF THE INVENTION

The present invention relates generally to modem devices for public switched telephone networks, and more particularly a loop current detector for such devices.

BACKGROUND OF THE INVENTION

CCITT V.32, V.32bis and V.34 are recommendations promulgated from the CCITT (Consultative Committee on International Telegraphy and Telephony) for modulation techniques that have evolved into standards for a series of higher speed modems used with personal computers. In general, these standards are based on a modified quadrature amplitude modulation technique designed to permit full-duplex transmission over a public switched telephone network (PSTN) at bit rates of 9.6 Kbps and greater. The key to operation of modems operating under these standards is a built-in echo canceling technique that enables transmitted and received signals to occupy the same bandwidth.

A problem with many PSTN echo canceling modems, however, occurs in the recognition of call termination. For example, when a user of an echo canceling modem is connected to an on-line service, the modem may have difficulty in determining when the service has disconnected. That is, to end the on-line session, upon command from the remote user, the service will disconnect. However, because of the time taken for the echo to be recognized, the remote modem will hang-on for several seconds before disconnecting itself to terminate the call. This leads to dissatisfaction on the part of the customer with respect to the modem device.

Many PSTN communications devices detect call termination by monitoring the loop current of the telephone line with devices placed in series with a loop-holding circuit. For example, current monitoring relays may be used for monitoring loop current, but such relays are generally large and relatively expensive. Modems commonly utilize a solid-state loop-holding circuit, or gyrator, in lieu of a large inductor to pull DC loop current on the telephone line from the local central office, while maintaining a high AC impedance. These solid-state devices usurp approximately 1 to 1.5 volts of tip-to-ring voltage, where this tip-to-ring voltage may only be on the order of a few volts on long subscriber lines. (At 20 mA loop current, for example, tip-to-ring voltage in the Japanese PTT tested at 6 V max, roughly 4 V for the historic 200 Ohm load in FCC Part 68 and 8 V max for 400 Ohm loads per EIA 470-A.)

The solid-state gyrators used in high-speed modems use regeneration to achieve the required high linearity for CCITT V.34 operation. As would be understood by a person skilled in the art, linearity is important at certain signal levels for maintaining spectral efficiency in terms of bits/Hz. Since the gain of bipolar and FET transistors decreases at low operating voltages, the voltage robbing solid-state series method of loop current detection is ill-suited to the linearity requirement and V.34 operation.

A digital signal processing method also exists in the prior art using an echo correlator. However, this method uses requires the uses of significant computing time and memory, and may require several seconds to determine that the far end has disconnected. Accordingly, there is a need for a quick and reliable methodology in modem devices to detect loop current interruption effectuated by the local central office on switched telephone lines.

SUMMARY OF THE INVENTION

The present invention is an integrated loop current detector for a public switched telephone network (PSTN) modem. The device is especially useful in echo canceling modems that comprise most high speed modems on the market today, since a high degree of linearity required by these high speed modems is able to be maintained. In one advantageous embodiment of the present invention, the current detector includes a solid-state loop hold circuit coupled to terminals of the PSTN. A current mirror circuit coupled in parallel with the loop holding circuit operates the control input of an opto-coupler. The opto-coupler output is coupled to a current detect input of the modem. An isolated output for quick and reliable indication of current interruptions in the loop hold circuit is thus provided. The present invention is also suitable for use with modems not employing echo cancellation techniques, as well as current detection applications not involving communications networks.

BRIEF DESCRIPTION OF THE FIGURES

For a better understanding of the present invention, reference may be had to the following description of exemplary embodiments thereof, considered in conjunction with the accompanying drawings, in which:

FIG. 2 shows a circuit diagram for a second alternate embodiment of a current detector according to the present invention.

DETAILED DESCRIPTION

Figure 1:
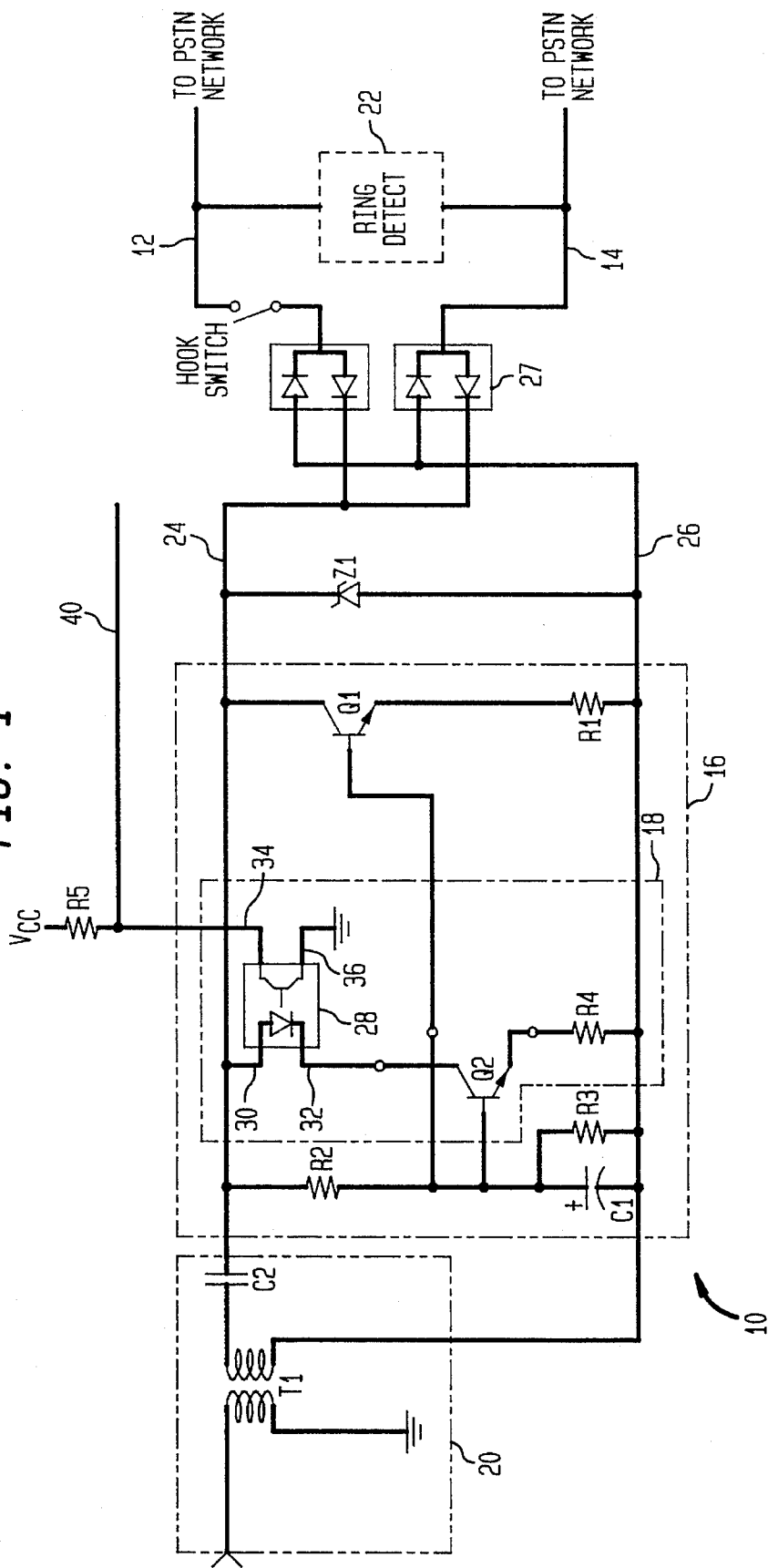
FIG. 1 shows a circuit diagram for one embodiment of an integrated PSTN current detector circuit in accordance with the present invention.

Referring to FIG. 1, there is shown a circuit diagram for one embodiment of an integrated loop current detector 10 in accordance with the present invention. In the shown embodiment, the loop current detector of the present invention is utilized with high speed modems for personal computers, for example, those modems operating in accordance with V.32bis and V.34 CCITT standards. However, as would be understood by a person skilled in the art, the present invention loop current detector may also be utilized with other modem devices operating in conjunction with a public switched telephone network (PSTN) or other similar networks. As shown, the loop current detector 10 includes a tip and ring input terminal 12, 14, respectively, which are coupled to terminals of a PSTN telephone line. In general, the current loop detector 10 includes a loop hold circuit 16, a current mirror circuit 18 and isolation circuitry 20 for isolating the internal components of the modem from the telephone line circuitry. As would be understood, ring detection circuitry 22 may also be coupled between the tip and ring inputs 12, 14 of the modem, however, such circuitry is not within the primary focus of the present invention and therefore need not be disclosed in further detail.

As shown, the loop hold circuit 16 of the present invention includes transistor Q1, coupled in conjunction with R2, R3, and C1 components adapted to hold the connection or "loop" once a connection has been made over the PSTN. Specifically, the tip and ring terminals 12,14 of the modem are coupled to first and second terminals 24,26, respectively, of the loop hold circuit 16 through bridge circuitry 27.

Although the shown embodiment of FIG. 1 is described with reference to bipolar transistors, it will be understood that other types of transistor switching devices, e.g., FETs, etc., may also be utilized in appropriate applications.

While not the primary focus of the present invention, the loop hold circuit 16 includes resistor R2 coupled between the base of transistor Q1 and its first terminal 24. Capacitor C1 and resistor R3 are coupled in parallel between the base of Q1 and the second terminal 26. R2 and R3 set the DC operating point for the loop hold circuit while C1, R2 and R3 create a high impedance to AC at the base of Q1; this establishes a gyrator effect for the loop hold circuit 16. Medium power zener diode Z1 protects Q1 and Q2 from transients.

A current mirror circuit 18 is coupled in parallel with the loop hold circuit 16 between the first and second terminals 24,26 thereof. The current mirror circuit 18 includes transistor Q2, resistors R4 and R5 and opto-coupler 28. As shown, the base of transistor Q2 is coupled to the same point as the base of transistor Q1. The emitter of transistor Q2 is coupled to the second terminal 26 of the loop hold circuit 16 through resistor R4. In the preferred embodiment of the invention, opto-coupler 28 is an integrated circuit package adapted to provide an isolated closed circuit output in response to a predetermined input signal level. Opto-coupler devices are well-known in the art and are made by a number of manufacturers, for example Toshiba p/n TLP 121. In the shown embodiment, a first input terminal 30 of the opto-coupler 28 (representing the anode end of an internal diode device) is connected to the first terminal 24 of the loop hold circuit 16, while a second input terminal 32 (cathode end of the diode device) is coupled to the collector of Q2. As shown, one output 34 of the opto-coupler is coupled to ground, while a second output 36 is coupled to a PSTN current detect terminal 40 of the modem. The PSTN current detect 40 is coupled to an input of the modem controller (not shown) and is also coupled to VCC through pull-up resistor R5.

Isolation circuitry 20 is provided at a back end of the loop hold circuitry 16 to isolate the internal modem circuitry and provide protection from, for example, power surges, transients, lightning, etc. As shown, the isolation circuitry 20 includes DC blocking capacitor C2 and isolation transformer T1. As would be understood, the isolation transformer typically provides effective isolation for longitudinal surges on the PSTN communication lines.

As mentioned previously, the output terminals 12, 14 of the modem device, which device includes the current detect circuit of the present invention, will be connected to the tip and ring of a two-wire PSTN telephone line. When the modem goes off-hook, DC current from a battery located at the local central switching office travels in a closed loop path through the loop hold circuit 16. When the modem is off-hook, the vast majority of DC loop current flows through Q1 and R1. This loop current ranges from about 20 mA on long loops to nearly 100 mA on short loops.

The addition of the current mirror circuit 18 to the loop hold circuit 16 presents a quick and reliable method for the detection of loop current interruption effectuated by the central office. Since the base of Q2 and Q1 are connected at the same point within the circuit, the emitter voltages of Q2 and Q1 will match. In a preferred embodiment of the present invention R4 is ten times that of R1, thus the current through R4 is one-tenth the current through R1. (It would be understood, however, that values of resistors R1 and R4 could be selected so that the current through R4 is anywhere in the range of between 2 and 50 times that of R1.) When the loop holding circuit is pulling 20 to 100 mA of loop current from the PSTN, the emitter of Q2 is about one-tenth, or 2 to 10 mA. That is, for reasonably high gain (alpha equal to 1), the collector current will approximate the emitter current. At these levels the opto-coupler 28 will saturate its receive photo transistor with the 2 to 10 mA of forward current from the collector of Q2. This is within the acceptable range of saturation current, as typical opto-coupler devices specify current at 50 mA maximum. The output of the opto-coupler then pulls the PSTN current detect line 40 to low indicating that current is flowing through the loop from the central office.

The PSTN current detect line will be monitored by the modem controller for interruptions in the loop current, for example, as per EIA/TIA-496-A. When the current is interrupted by the termination of a call connection, for example, by disconnecting from an on-line service, current flow through the collector of Q2 is interrupted so that the photo transistor of opto-coupler 28 is no longer in saturation. The output of the opto-coupler 28 then stops conducting so that the PSTN current detect line 40 is no longer pulled to ground. Since the current detect line is coupled to VCC through pull-up resistor R5, this produces a high on the current detect line 40. This condition indicates an interruption in loop current at the modem controller which signals the modem to immediately hang-up.

The above described current mirror circuit 18 used in conjunction with a loop hold circuit 16 provides a significant improvement over current monitoring circuits of the prior art. As shown the current mirror circuit is coupled in parallel with the loop hold circuit and draws only minimal additional current, for example, one-tenth that of the current already being drawn by the loop hold circuit. This is in contrast to those "in-series current monitoring devices which are considerably more current intensive. The current mirror circuit 18 uses off-the-shelf components which add little to the overall cost of the loop hold circuit. In addition, the current detection methodology of the present invention is quick and reliable, since the effects of the echo canceling protocols no longer come into play. This improved response time leads to increased customer satisfaction with the product. Although the present invention is described as using off-the-shelf discrete components, it would be understood the present invention may also be included as part of a single integrated circuit package.

Referring to FIG. 2, there is shown a circuit diagram for an alternate embodiment of the present invention circuit detector 60. As with the embodiment shown in FIG. 1, the embodiment of FIG. 2 includes a current mirror circuit 62 coupled in parallel with a loop hold circuit 64. In a similar fashion, the current mirror circuit 62 includes transistor T5, opto-coupler 66 and current mirror resistor R10, wherein the output of the opto-coupler 66 is coupled to a current detect line 70. In this case, however, the loop hold circuit 64 includes real inductors L1 and L2. As shown, the base of transistor T5 is coupled between terminals 72, 74 of inductors L1 and L2. Inductors L1 and L2 have a series resistance in order to set the DC operating point of the circuit. Operation of the circuit is similar to that of FIG. 1, in that once current is interrupted in the loop hold circuit 64, an indication is present on the current detect line 70. As would be understood, the embodiment of FIG. 2 may have applications in fields other than communications. Some suitable applications would include the monitoring of high current servo loops and industrial controls.

Appendix 1 lists some exemplary values for the components shown in the embodiment of FIG. 1. From the above, it should be understood that the embodiments described, in regard to the drawings, are merely exemplary and that a person skilled in the art may make variations and modifications to the shown embodiments without departing from the spirit and scope of the invention. For example, although the present invention circuitry is described with reference to bipolar transistors, it would be apparent to one having ordinary skill in the art to use other variations of transistors or amplification devices (e.g., op amps) and isolation couplers. All such variations and modifications are intended to be included within the scope of the invention as defined in the appended claims.

Appendix 1

Q1—high gain, medium power transistor, possibly darlington, for example, Central Semiconductor CZT 3019, CZT 2000, CZT 3904

Q2—2N3904

R1—22.1 Ω

R2—15K Ω

R3—5.76K Ω

R4—221 Ω

C1—10 μF

R5—10K Ω

What is claimed is:

1. A current detector circuit device for use with a loop holding circuit, said device comprising:

a current mirror circuit coupled in parallel with said loop holding circuit, said current mirror circuit including, transistor means coupled to said loop holding circuit for detecting interruptions in loop current flowing through lines to which the current detector circuit is adapted to be coupled; and an isolating coupling device coupled to said transistor means and operative to trigger an output thereof in response to a predetermined input signal level, said output of said coupling device being coupled to a current detect input, thereby providing an isolated output indicative of current interruption in said loop holding circuit.

2. The device of claim 1, wherein said loop holding circuit is used in conjunction with a modem, said loop holding circuit adapted to be coupled to a communications network.

3. The device of claim 2, wherein said communications network is a public switched telephone network (PSTN).

4. The device of claim 2, wherein said modem is operable in connection with a standards group consisting of V.32, V.32bis, and V.34.

5. The device of claim 1, wherein said current detect input is coupled to a an input of a modem controller.

6. The device of claim 1, wherein said isolating coupling device is an opto-coupler.

7. The device of claim 6, wherein said loop holding circuit includes a transistor having a control terminal coupled to said control terminal of said transistor means in said current mirror circuit, wherein first and second electrodes of said transistor are coupled to first and second terminals of said loop holding circuit.

8. The device of claim 7, wherein said loop holding circuit includes, charging means coupled in parallel with a first resistor coupled in parallel with a second resistor, the combination thereof being coupled between terminals of said loop holding circuit creating a high impedance to AC at said transistor and thereby establishing a gyrator effect for said loop holding circuit.

9. The device of claim 1, wherein said loop holding circuit includes first and second inductors having a series resistance to establish a DC operating point, a control terminal of said transistor means being coupled at a connection point of said first and second inductors.

10. The device of claim 1, further including isolation circuitry for protecting internal circuitry of said modem from telephone line transients.

11. The device of claim 10, wherein said isolation circuitry includes an isolation transformer coupled in combination with DC blocking capacitors.

12. The device of claim 1, wherein said current mirror circuit includes a third resistor coupled to said transistor means and said loop holding circuit includes a fourth resistor coupled to said transistor, said third resistor being in a range of between 2 and 50 times the value of said fourth resistor of said loop hold circuit.

13. The device of claim 1, wherein said current mirror circuit is included in an integrated circuit package.

14. An apparatus for detecting interruptions in loop current for a modem adapted to be coupled to a public switched telephone network (PSTN), said apparatus comprising:

a solid-state loop hold circuit coupled to terminals of said PSTN;

a current mirror circuit coupled in parallel with said loop holding circuit, said current mirror circuit including, a transistor means having a control terminal coupled to an operating point of said loop holding circuit and operable to detect interruptions in said loop current flowing through said loop hold circuit in response to interruption of loop current; and an opto-coupler device having an input coupled to said transistor means and having an output coupled to a current detect input line of said modem, to thereby provide an isolated output indicative of current interruption in said loop hold circuit.

15. The apparatus of claim 14, wherein said loop holding circuit includes a transistor having a control terminal coupled to said control terminal of said transistor means in said current mirror circuit, wherein first and second electrodes of said transistor are coupled to first and second terminals of said loop holding circuit.

16. The apparatus of claim 14, wherein said current mirror circuitry is adapted to draw approximately one-tenth of the current drawn by said loop holding circuit.

17. The apparatus of claim 16, wherein said modem is a modem employing echo cancellation modulation techniques.

18. The apparatus of claim 14, wherein said current mirror circuit is included in an integrated circuit package.

19. A modem device adapted to couple to a public switched telephone network (PSTN), said modem device including a loop holding circuit, said device further including:

a current mirror circuit coupled in parallel with said loop holding circuit, said current mirror circuit including, a transistor means having a control terminal coupled to an operating point of said loop holding circuit and operable to detect interruptions in said loop current flowing through said loop holding circuit in response to interruption of loop current; and an opto-coupler device having an input coupled to said transistor means and having an output coupled to a current detect input line of said modem, to thereby provide an isolated output indicative of current interruption in said loop hold circuit.

20. The device of claim 19, wherein said modem is an echo canceling modem.

21. An integrated circuit including a current detector circuit for use with a loop holding circuit, the integrated circuit comprising:

a current mirror coupled in parallel with the loop holding circuit, the current mirror including:

at least one transistor coupled to the loop holding circuit for detecting interruptions in loop current flowing through lines to which the current detector circuit is adapted to be coupled; and an isolating coupling device coupled to said at least one transistor, the isolating coupling device operative to trigger an output in response to a predetermined input signal level, the output of the coupling device being coupled to a current detect input line, thereby providing an isolated output indicative of current interruptions in said loop holding circuit.

22. The integrated circuit of claim 1, wherein the current detector circuit comprises a modem operable in connection with standards selected from the group consisting of V.32, V.32bis, and V.34.

23. The integrated circuit of claim 21, wherein said current detector circuit is used in conjunction with a modem, said loop holding circuit adapted to be coupled to a communications network.

24. The integrated circuit of claim 23, wherein said communications network is a public switched telephone network (PSTN).

* * * * *